July 21, 1936.　　　　P. SANTURELLO　　　　2,048,142

FLUID DISPENSING DEVICE

Filed April 2, 1934

INVENTOR.
Peter Santurello.
BY
Corbex & Mahoney
ATTORNEYS.

Patented July 21, 1936

2,048,142

UNITED STATES PATENT OFFICE 2,048,142

FLUID DISPENSING DEVICE

Peter Santurello, Columbus, Ohio

Application April 2, 1934, Serial No. 718,656

1 Claim. (Cl. 221—80)

My invention relates to a fluid-dispensing device. It has to do, more particularly, with a fluid-dispensing device which is particularly suitable for dispensing hair-waving fluid or other liquids which are comparatively thick, or, in other words, which are of a high viscosity.

There have been various devices made in the past for dispensing fluids from a suitable container. However, most of these devices have not been suitable for dispensing hair-waving fluids or other fluids of high viscosity. Most of these prior art devices have also been complicated in structure and therefore expensive to make. Also, some of such devices have been difficult to operate and difficult to apply to and remove from container which is adapted to contain the fluid to be dispensed.

One of the objects of my invention is to provide a fluid-dispensing device which is particularly suitable for dispensing hair-waving fluids or other liquids which are comparatively thick and sticky or, in other words, which have a high viscosity.

Another object of my invention to provide a fluid-dispensing device which is very simple in structure, has a minimum number of parts, and which can consequently be made at a comparatively low cost.

Another object of my invention is to provide a fluid-dispensing device which is of such a type as to be simple in operation and which can be easily operated to dispense fluid, from a container to which it is applied, in a very efficient manner.

Another object of my invention is to provide a fluid-dispensing device which can be readily applied to or removed from a container adapted to contain the fluid to be dispensed.

In its preferred form my invention contemplates the provision of a fluid-dispensing device of the type indicated which is made up into a single unit and which is of such a type that it may be readily mounted on a container adapted to contain the fluid to be dispensed. This fluid-dispensing device comprises piston and cylinder mechanism adapted to be disposed within the container which is operable by handle or gripping members disposed on the outside of the container. When the cylinder and piston mechanism is properly operated by the handle or gripping members, the fluid will be forced from the container with considerable pressure.

The preferred embodiment of my invention is shown in the accompanying drawing wherein similar characters of reference designate corresponding parts and wherein.

Figure 1:
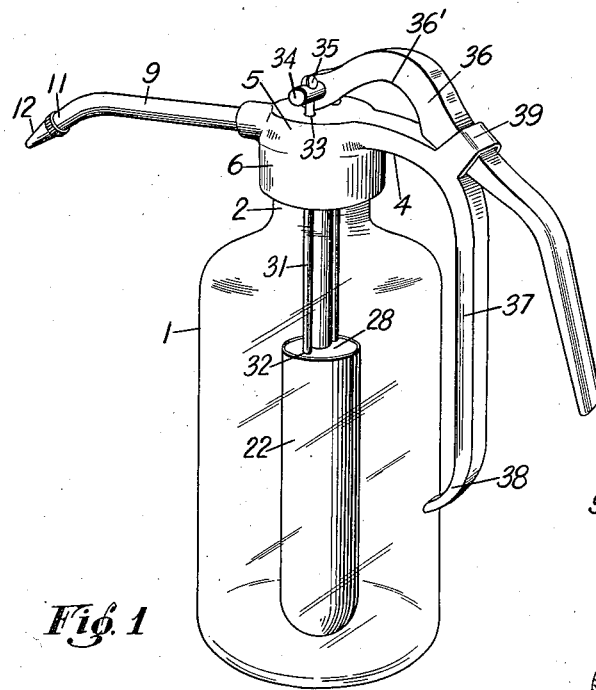
Figure 1 is a perspective view of my fluid-dispensing device applied to a bottle which is adapted to contain the fluid to be dispensed.

With reference to the drawing, I have shown a glass bottle 1 which is preferably provided for containing the fluid to be dispensed. This glass bottle has a neck 2 on its upper end which is provided with threads on its outer surface as indicated at 3.

My fluid-dispensing device 4 is made up into a single unit which is separate from the container 1. This fluid-dispensing device comprises a cap member 5 which is provided with a depending annular flange 6, provided with a threaded portion 7, adapted to cooperate with the threads 3 on the neck 2 of the container. Thus, the cap member 5 may be screwed onto the neck 2 and will be firmly held thereon. Also, it may be readily removed from the neck of the container when desired.

The cap 5 is provided with an L-shaped passageway 8 formed therein and through which fluid is adapted to pass. In the outer end of this passageway 8 the inner end of a tube 9 is threaded as indicated at 10. This tube 9 extends outwardly from the container a comparatively great distance and is then preferably bent downwardly as indicated at 11. In the outer end of this tube, the threaded inner end of a nozzle member 12 is preferably screwed as indicated at 13. This nozzle member is adapted to form a small stream of the fluid which is being dispensed.

Figure 2:
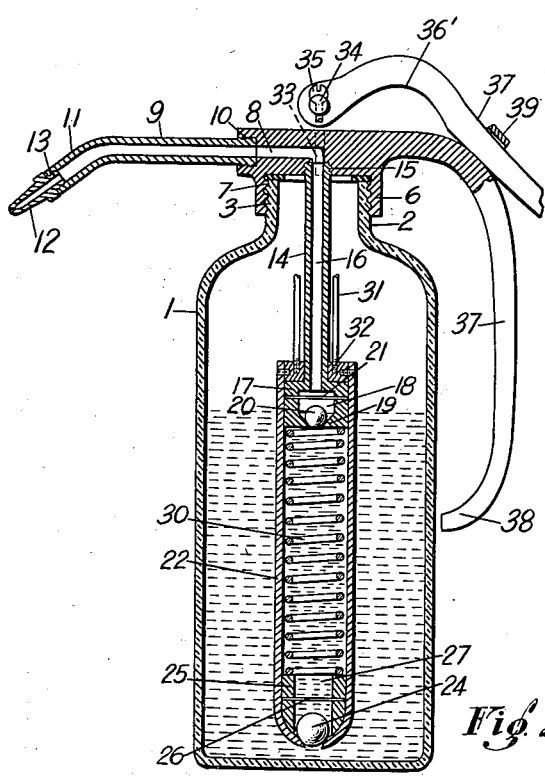
Figure 2 is a vertical sectional view of the fluid-dispensing device and the container, the cylinder of the dispensing mechanism which is in the container being turned slightly from its true position for illustrative purposes, the cylinder being shown in its lowermost position.

The inner and lower end of passageway 8 has the upper end of a tubular member 14 threaded thereinto, as indicated at 15. When the fluid-dispensing device is on the container, this tubular member extends downwardly thereinto a comparatively great distance. The tubular member 14 has a fluid passageway 16 extending entirely therethrough. The lower end of this tubular member 14 has an enlarged cylindrical portion 17 formed thereon and which is preferably integral therewith. This cylindrical portion 17 is adapted to serve as a piston, as will be described later. This portion 17 has a chamber 18 formed therein which communicates with passageway 16. The walls of this chamber 18 are tapered inwardly at their lower end, as indicated at 19, to form a seat for a ball 20 disposed in such chamber. It will be apparent that this ball is smaller than the chamber 18. A pin 21 extends transversely of the chamber 18 at a point slightly below the lower end of passageway 16. This pin is provided in order to preclude seating of the ball 20 in the lower end of passageway 16, thereby closing said passageway. When the ball is seated on its tapered seat, as indicated in Figure 2, the lower end of chamber 18 will be closed.

The piston formed by portion 17 is adapted to be disposed in a cylinder 22 which will also be within the container when the fluid-dispensing device is mounted thereon. This cylinder 22 is comparatively long and surrounds the piston 17 and is movable vertically relative thereto as will be described more fully later. The lower end of the cylinder 22 is of convex shape on its outside and, consequently, of concave shape on the inside. This end of the cylinder is provided with an opening 23, the edges of which are tapered to form a seat for a ball 24. This ball is adapted to close this opening when seated. A collar member 25 is disposed in the lower end of this cylinder and a transverse pin 26 extends across the passageway 27, extending therethrough. This pin 26 prevents upward movement of the ball 24 to a too great extent when the said ball is unseated.

The upper end of the cylinder 22 is closed by an annular disc 28 which is disposed within the end of the cylinder and above the piston 17. This disc 28 is held in position by a plurality of small screws 29 which pass through the wall of the cylinder and into the edge of disc 28. This disc 28 is provided with a central opening through which the tubular member 14 passes. This opening is large enough to permit up and down movement of the disc 28 relative to the member 14. As shown in Figure 2, the cylinder 22 may move downwardly relative to piston 17 until the disc 28 rests on the upper end of piston 17. A compression spring 30 is provided within the cylinder for normally maintaining the cylinder in its lowermost position, as indicated in Figure 2. The upper end of this compression spring abuts the lower end of piston 17 and the lower end of said spring abuts the upper end of collar member 25.

As previously stated, the cylinder 22 is adapted to be moved up and down relative to the piston 17. The mechanism for accomplishing this will now be described:

This mechanism comprises a pair of rods 31 which have their lower ends threaded into the disc 28 at the upper end of the cylinder, as indicated at 32. These rods pass upwardly along the tubular member 14 and up through openings 33, formed in the cap member 5. These openings 33 are slightly bigger than the rods 31 to permit the rods to readily reciprocate therein and also to allow air to pass into the container when the dispensing device is mounted thereon for a purpose to be described more in detail. These rods 31 extend upwardly from the top of cap member 5 and extend through the outer ends of a transverse pin 34. The heads 35 of these rods or screw bolts prevent them from coming out of the holes in the pin 34.

The pin 34 extends transversely through an opening in one end of a handle or gripping member 36. This pin serves as a pivot pin for this end of the handle member 36. This handle member 36 is of such a shape and is so mounted that there will always be a direct vertical pull on the rods 31 and lateral pulls thereon will be practically eliminated. In order to accomplish this, the handle member is bent or curved, as indicated at 36', so that it will be substantially L-shaped. The downwardly extending portion of this handle member 36 rests on the upper surface of a second handle member 37. This handle member 37 is preferably formed as an integral part of the cap 5. It extends outwardly from the cap a sufficient distance and then downwardly in substantially parallel relation with the outer surface of the container. Then it is curved inwardly, as indicated at 38. A space sufficient to permit passage of the fingers of the hand is provided between the downwardly extending portion of handle member 37 and the container.

Figure 3:
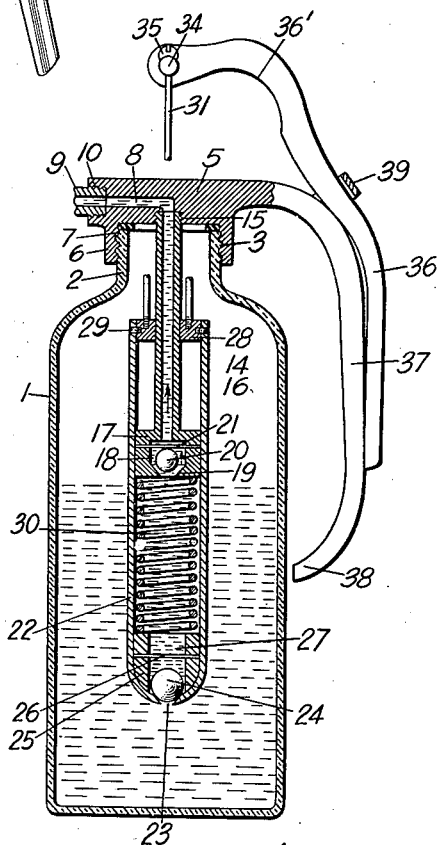
Figure 3 is a vertical sectional view substantially identical with Figure 2, with the exception that the cylinder is shown as being moved upwardly relative to the piston.

The handle member 37 adjacent its upper end is provided with a yoke or strap member 39, through which the handle member 36 passes. The handle member 36 is slidable back and forth in this member 39. When the cylinder 22 is in its lowermost position, as indicated in Figures 1 and 2, the lower portions of handle members 36 and 37 will be spaced apart, as indicated in Figure 1. Because of their shape and the manner in which they are mounted, they may be readily grasped in the hand and pressed together till they are in the position indicated in Figure 3. Because of the fact that the handle member 36 is slidably mounted on handle member 37, and because of the shape of handle member 36, this will cause a direct vertical pull to be exerted on the rods 31 and thereby cause raising of cylinder 22 relative to piston 17. As soon as the gripping action, which causes the handle members to come together, is released, the spring 30, which is compressed during upward movement of cylinder 22, will immediately expand and cause the handle members to spread apart, as indicated in Figures 1 and 2. Thus, by alternately pressing the handle members together and releasing them, the cylinder 22 may be raised and lowered relative to the piston 17.

In the operation of my device, the container is filled or substantially filled with the fluid to be dispensed. In order to fill the container, the cap member 5 is screwed off of the neck 2 of the container and then the entire fluid-dispensing device can be removed as a unit. When the container has been filled, the cylinder 22 and associated parts are inserted into the container and the cap 5 is screwed in position. Then the fluid-dispensing device will be in proper position ready for operation.

As shown in Figure 2, the cylinder 22 will extend downwardly in the container and into the fluid disposed therein. The handle members 36 and 37 will be spread apart. The weight of the fluid in the container will force the lowermost ball check valve open and will cause the chamber in the cylinder to fill with fluid to be dispensed, or at least to the level of the fluid in the container, as illustrated in Figure 2. However, the filling of this cylinder 22 may be hurried by alternately pressing the handle members together and releasing them, to accomplish rarefaction of the air in the cylinder, as will be described more clearly.

When the cylinder 22 has fluid to be dispensed therein, (Figure 2), and it is desired to dispense said fluid, the handle members are pressed together to cause upward movement of cylinder 22 relative to piston 17. When this is done, the lowermost ball 24 will be seated and the other ball 20 will be unseated. Consequently, flow of fluid from the lower end of cylinder 22 through opening 23 will be precluded. However, during upward movement of cylinder 22, the ball 20, as previously stated, will be unseated, and will continue to be unseated. Consequently, upward movement of the cylinder 22 will force the fluid therein upwardly through chamber 18, passageway 16, passageway 8, through tube 9 and, finally, out through nozzle member 12. The fluid will be forced from the nozzle member with considerable pressure and will be formed into a small stream by such member. By the time the cylinder 22 reaches its uppermost position, substantially all the fluid will have been forced from the cylinder 22.

Now if the handle members are released they will spread apart, due to the fact that the spring 30 will force the cylinder 22 downwardly relative to piston 17. Upon downward movement of cylinder 22, relative to piston 17, vacuum is produced in cylinder 22 and, consequently, outside air pressure, and pressure of any fluid which might remain in passageway 16, will cause the ball 20 to seat. However, the ball 24 will be unseated upon downward movement of cylinder 22. Therefore, because of creation of vacuum in cylinder 22, and because of the pressure of the fluid in the container, the cylinder 22 will again fill with fluid to be dispensed. Also, air pressure in the container above the fluid will aid in causing the fluid to flow into the cylinder 22. By repeatedly pressing the handle members 36 and 37 together, and allowing them to spread apart, the fluid may be forced from the container under considerable pressure and in a continuous stream. However, if desired, by proper operation, the fluid may be dispensed in such a manner that it will not issue from the device with very much force.

All of the various parts of my dispensing device are made of metal. It is not necessary to use any fibre or rubber washers or packing of any kind. This makes this device particularly suitable for dispensing sticky liquids, and liquids of high viscosity, without injuring the device or rendering it inoperative. Further, there are no parts that will wear out easily. Also, my device may be readily cleaned when necessary. Cleaning is facilitated by the fact that although the fluid-dispensing device is assembled into a single unit, all parts thereof may be readily separated for cleaning purposes. For example, nozzle 12 may be removed from tube 9, tube 9 may be removed from cap member 5 and tubular member 14 may be removed from this cap member. The piston 17 may be removed from cylinder 22 by removing the disc member 28 in the upper end thereof. The valves which I employ are ball check valves and function very efficiently, even when dispensing fluid, such as hair-waving fluid, of a high viscosity.

Another important feature of my invention resides in the fact that my device is very simple in structure and can be manufactured at a low cost. Furthermore, it is made up as a single unit which can be readily applied to or removed from the container, at will. My device is easy to operate and dispenses the fluid in a very efficient manner. Many other advantages will be readily apparent.

Having thus described my invention, what I claim is:

Apparatus for dispensing fluid comprising a container, a cap closure therefor, a finger grip integral with said cap closure and spaced from the side of said container when the cap closure is in place thereon, said finger grip having an abruptly curved shoulder, a coacting lever bearing upon said curved shoulder and constituting it a rocking fulcrum, a hollow fixed piston depending from said cap closure and adapted to extend into said container, a cylinder slidable upon said piston, check valves carried by the piston and cylinder respectively, a discharge tube communicating with the interior of said piston, rod means for reciprocating said cylinder, said means extending through the closure cap and pivotally engaging the coacting lever, said coacting lever being formed with a depending portion adapted to be grasped in the palm of the hand and an intermediate curved portion in contact with the rocking fulcrum of the finger grip, a guide adjacent the said rocking fulcrum to retain the lever and finger grip in engagement, whereby when they are respectively grasped in the palm and fingers of one hand and pressure is applied, the lever will rock upon its fulcrum and will also slide thereon to cause vertical reciprocation of the rod means and to reciprocate the cylinder, thereby to draw successive charges of fluid into the cylinder past the check valve therein, and alternately to expel such charges past the check valve in said piston and through said discharge tube.

PETER SANTURELLO.